Apr. 3, 1923. 1,450,606
H. E. PAINE
PIPE UNION
Filed July 21, 1920
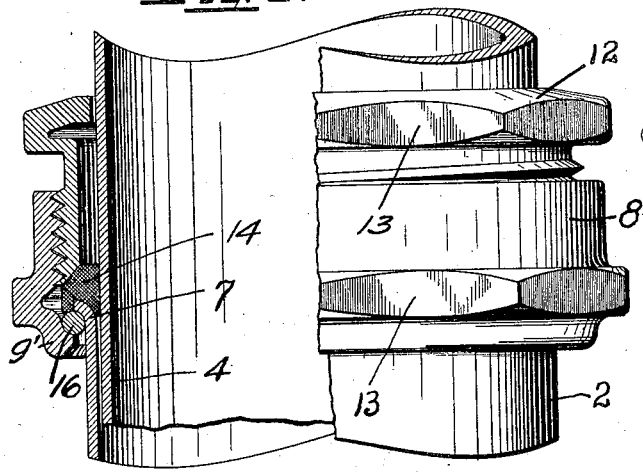
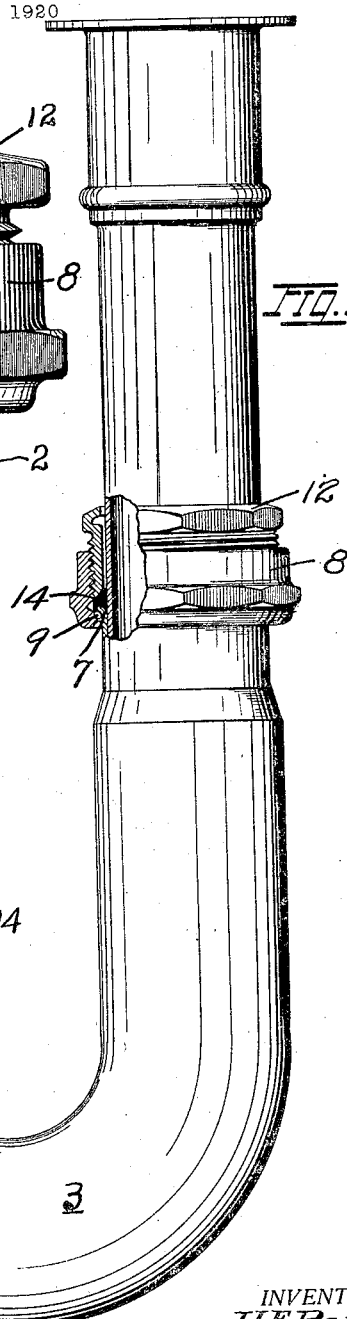
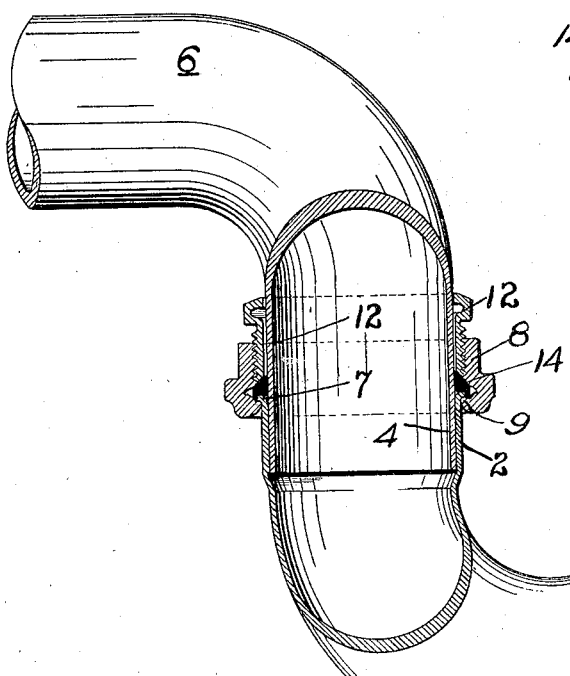
WITNESS
H. C. Sherburne
INVENTOR
H. E. Paine
BY White Prost & Evans
his ATTORNEYS Patented Apr. 3, 1923.

1,450,606

UNITED STATES PATENT OFFICE.

HENRY E. PAINE, OF SAN FRANCISCO, CALIFORNIA.

PIPE UNION.

Application filed July 21, 1920. Serial No. 397,853.

*To all whom it may concern:*

Be it known that I, HENRY E. PAINE, a citizen of the United States, and a resident of the city and county of San Francisco and State of California, have invented a new and useful Pipe Union, of which the following is a specification.

My invention relates to a union for joining pipes together.

An object of the invention is to provide a union for joining together pipes having unthreaded ends. Another object is to provide a union suitable for use with pipes of light gauge.

The invention possesses other objects and features of advantage, some of which, with the foregoing, will be set forth in the following description of the preferred form of my invention which is illustrated in the drawings accompanying and forming part of the specification. It is understood that I do not limit myself to the showing made by the said drawings and description, as I may adopt variations of the preferred form within the scope of my invention as set forth in the claims.

Referring to the drawings: Fig. 1 is an elevation partly in section of a basin trap, in which the parts are joined by two of my unions, which vary somewhat in structure. Fig. 2 is an elevation on a larger scale, and partially in section, of the ends of two pipes connected by my union.

For many purposes a light gauge pipe is more desirable than a heavy gauge pipe. Heretofore it has been customary with light gauge pipes, when a joint was to be effected with a slip union, to braze an annular threaded ring about the end of one of the pipes with which the sleeve portion of the union engaged to compress the gasket surrounding the other pipe. This is a relatively expensive construction and frequently leaky thru defective brazing of the threaded ring. The broad purpose of my invention is to obviate this two-piece brazed structure and to provide a secure slip union for pipes of too thin a gauge to permit threads to be formed thereon. Such a union may be used wherever desired, but in Fig. 1, I illustrate one of the most convenient of its applications.

One end 2 of the gooseneck 3 is expanded to form a socket in which the end 4 of the waste pipe 6 may be slipped. The extreme end of the gooseneck is provided with a short outturned flange 7 formed preferably integral with the pipe by spinning or otherwise as desired. If the gooseneck and waste pipe are of the same diameter, this enlargement and flange represent the only alteration necessary to be made in either pipe. If the internal diameter of the gooseneck permits the insertion of the waste pipe without expanding, then only the short external flange is formed. Owing however to the fact that it is usually desirable to use pipes of the same size, it is preferred to expand the end of one to form the socket for the unaltered end of the other.

A socket ring 8 internally threaded at one end is formed at the other end with an inturned flange 9 of slightly larger internal diameter than the socket 2, so that the flanges 7 and 9 will engage when the socket ring is assembled over the gooseneck from the opposite or smaller end. The engagement of the flanges prevents the withdrawal of the socket ring from the pipe 3 when the union is tightened. Surrounding the end 4 of the other pipe is a stud ring 12, threaded externally to engage in the socket ring 8. Both socket and stud rings are provided with flanges having flattened faces 13 to provide wrench holds. A gasket 14 of compressible material is interposed between the flange 7 and the adjacent end of the stud ring, which is formed with an internal bevel to more effectively compress the gasket against the end of the flange 7 and the lateral face of the enclosed pipe.

To apply the union, the socket ring is assembled over the flanged pipe from the small end, and the stud ring slipped on the stud end of the other pipe, followed by the gasket. The pipes are next brought together, the stud end of one in the socket end of the other, and the socket and stud rings screwed together until the gasket is tightly compressed between the end of the stud ring, the flange 7, and the face of the enclosed pipe. The parts are now in the position shown in the lower union of Fig. 1, and the pipes are securely held together without danger of leakage. Unscrewing the stud ring from the socket ring permits separation of the pipes.

In some cases, as for example that illustrated in the upper union of Fig. 1, the socket ring cannot be assembled from the end opposite to the flange 7. The structure shown in Fig. 2 is provided for such conditions. It differs from that described by the inclusion of a bushing ring 16, preferably of round spring wire which is interposed between the flange 7 and flange 9'. The flange 9' is of such internal diameter that the ring may be slipped over the flange 7. After assembling the socket ring, the bushing ring is inserted, so that the withdrawal of the socket ring over the flange is prevented when the union is tightened.

I claim:

1. A pipe union comprising an external flange on one of the pipes, a socket ring having an internal flange and adapted to be passed over the external flange, a bushing ring interposed between said flanges, a stud ring, in threaded engagement with said socket ring and a gasket interposed between the stud ring and the external flange and adapted to be expanded inwardly when the stud ring is turned in the socket ring.

2. A pipe union for joining two pipes together, comprising an out-turned flange on one of said pipes, a socket ring having an in-turned flange of slightly larger opening than said out-turned flange, a bushing ring interposed between said flanges, a stud ring threaded into said socket ring, and a gasket interposed between said stud ring and out-turned flange, and lateral face of the other pipe.

3. A pipe union for joining two unthreaded, telescoped pipes together, comprising an out-turned flange integral with one of said pipes, a socket ring enclosing the flange, means for preventing the withdrawal of the socket ring over said flange, a stud ring in threaded engagement with said socket ring, and a gasket interposed between said stud ring and end of said flanged pipe and the lateral face of the other pipe.

4. A pipe union for joining two pipes together, comprising an expanded portion of one of the pipes forming a socket for the end of the other pipe, an out-turned flange on said expanded portion, a socket ring enclosing said flange, means for preventing the withdrawal of the socket ring over said flange, an annular gasket arranged within said socket ring upon the out-turned flange, and means for deforming said gasket inwardly to bind about the lateral face of said other pipe.

5. A pipe union for joining two pipes together comprising an expanded portion of one of the pipes forming a socket for the end of the other pipe, an out-turned flange on said expanded portion, a socket ring having an in-turned flange of slightly larger opening than said out-turned flange, a bushing ring interposed between said flanges, a stud ring threaded into said socket ring and having an internally beveled end, and a gasket interposed between the beveled end of said stud ring and the out-turned flange and deformable inwardly upon the lateral face of said other pipe when the stud ring is turned in the socket ring.

In testimony whereof, I have hereunto set my hand.

HENRY E. PAINE.